Dec. 9, 1930.   E. DELALE   1,784,180
ROOF FOR CARRIAGE BODIES
Filed July 9, 1926   2 Sheets-Sheet 1
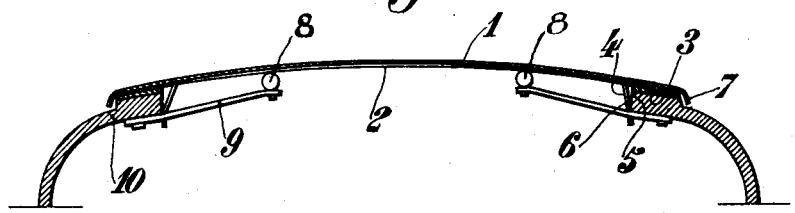
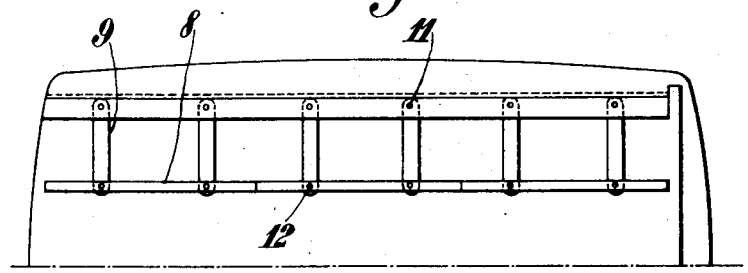
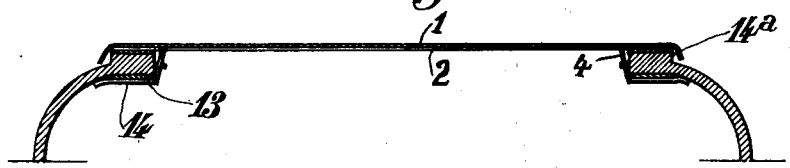
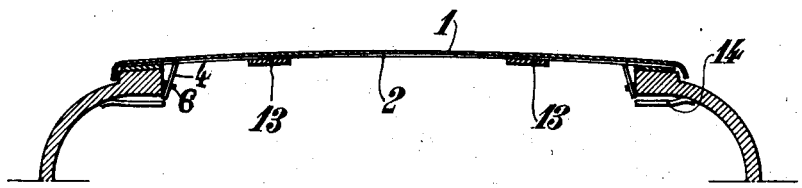
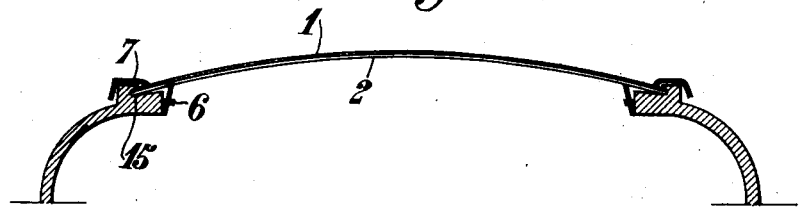
E. Delale
inventor
By: Marks & Clark
Attys Dec. 9, 1930.                    E. DELALE                    1,784,180
                          ROOF FOR CARRIAGE BODIES
                          Filed July 9, 1926      2 Sheets-Sheet 2
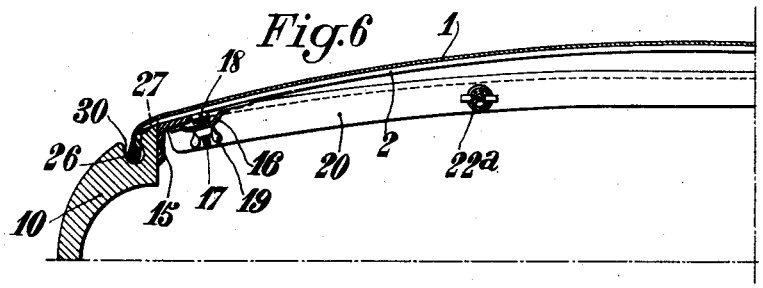
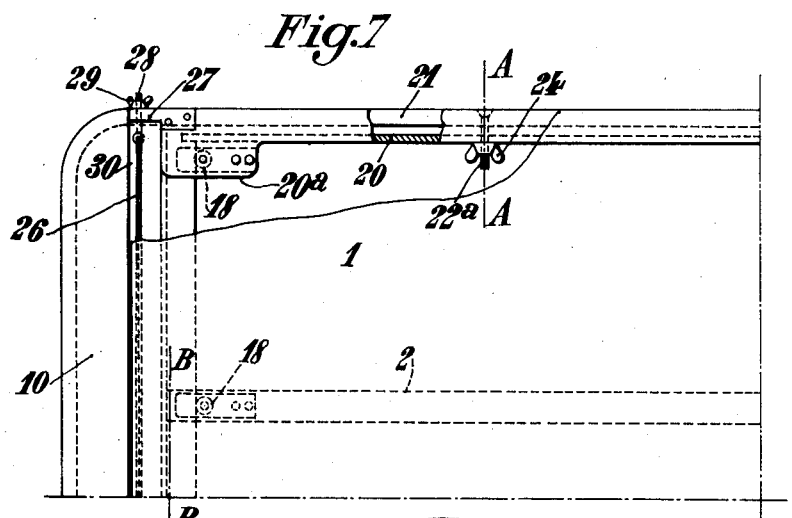
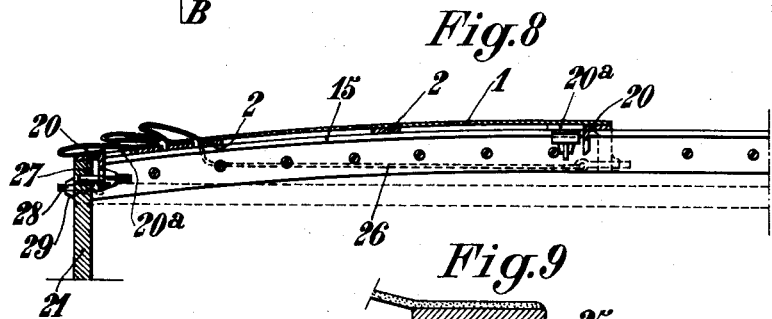
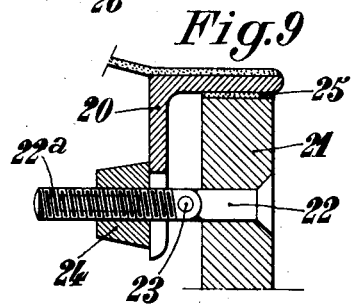
E. Delale
   inventor
By: Marks & Clerk
      Attys Patented Dec. 9, 1930

1,784,180

UNITED STATES PATENT OFFICE

EMILE DELALE, OF PARIS, FRANCE

ROOF FOR CARRIAGE BODIES

Application filed July 9, 1926, Serial No. 121,443, and in France September 12, 1925.

The present invention relates to improvements in carriage tops for motor and like vehicles and, in particular for hood devices permitting the easy transformation of a closed carriage body into an open carriage body and reversely.

These improvements are essentially characterized by the fixed side and rigid walls of the carriage body of one or more flexible hood elements capable of being folded either to the front or to the rear of the vehicle and held in a stretched condition with a deflection rendering their upper surface convex, when they cover the carriage body, by resilient devices exerting a pressure under these hood elements.

The accompanying drawing illustrates by way of example only, various forms of carrying out improvements such as above characterized.

Figs. 1 and 2 relate to a first form of construction and are:

Fig. 1 a cross section of the upper part of the carriage body of a motor vehicle embodying the invention.

Fig. 2 a diagrammatic half plan view, on a smaller scale, corresponding to Fig. 1.

Figs. 3 and 4 illustrate respectively in cross section a second form of construction of the top before and after putting in action the tension means of the flexible hood.

Fig. 5 also illustrates in cross section a third form of construction of top.

Figs. 6 to 9 relate to a fourth form of construction and are:

Fig. 6 is a half view in vertical section of a carriage body roof.

Fig. 7 is a corresponding partial plan view.

Fig. 8 is a partial longitudinal section of the roof according to A—A, B—B of Fig. 7, showing the flexible hood partly folded.

Fig. 9 is a partial vertical section, on an enlarged scale, according to A—A of Fig. 7.

In accordance with the subject-matter of the present invention, the hood is constituted by a flexible outer watertight covering lined if necessary with canvas or cloth. Inside of the hood are arranged transverse resilient blades of steel or wood for instance and secured by rivets or otherwise. These blades bear upon the upper side edges of the carriage body and the flexible hood is provided throughout its length with dependent borders or curtains preventing leakage of water to the interior of the vehicle. Securing means are arranged on the inner face of the flexible hood and distributed at suitable intervals.

In the example of Figs. 1 and 2, is shown the flexible hood at 1 and the transverse reinforcing blades are shown at 2. The carriage body is provided with rigid uprights and open at the top and the flexible hood may be housed in any suitable place (not shown) either at the front, or at the rear of the vehicle, and is unwound or unfolded so that the ends of the transverse blades 2 freely slide on the upper faces 3 of the edges of the carriage body. Securing members 4, preferably constituted by resilient bands, are attached near the ends of the blades 2 for engagement with suitable studs 6 secured on the inner faces 5 of the edges of the carriage body. Flexible curtains 7 border the hood and freely fall on the carriage body for forming closures preventing leakage of water to the interior of the car.

For covering the carriage, it suffices, from the interior of the car, to unfold the hood 1 over the open body. The transverse blades 2 can have an initial camber, but this camber can also be obtained by tension means which enter in action after the hood has been unfolded and hooked on.

In the example of Figs. 1 and 2, these tension means are constituted by rods 8 the ends of which are pivoted to the resilient blades 9 which are themselves pivoted on the lower face 10 of the edges of the carriage body. It is possible to use for instance three rods 8 which, owing to their joints 11 on the one hand, and 12 on the other hand, can be placed in alignment with each other, (as illustrated in Figs. 1 and 2). The resilient blades 9 which can be made of steel, for instance, have an initial camber which places the rods 8 distinctly above the horizontal plane containing the edges of the carriage body. The rods 8 can be turned out and placed end to end or folded and concealed under the faces 10. The resiliency of the blades allows the same, as well as the rods 8 to straddle each other in folded position. When the hood has been stretched and hooked on as previously indicated, if the rods 8 are brought in the position they occupy in Figs. 1 and 2, it will be seen that the resiliency of the blades 9 acts on the hood for giving to the latter, owing to the resiliency of the transverse blades 2, a convex outer surface facilitating the flowing off of rain water and the member to maintain in the top the swelled or bulged out appearance actually in vogue.

The blades 9 and the rods 8 which constitute a practical tension device of small compactness for the hood can however be replaced by various other means and such in particular as those shown in Figs. 3 and 4. In these figures the same reference numbers designate the same parts or corresponding parts used for the form of construction of Figs. 1 and 2. One or two steel blades 13 arranged at rest on supports 14 placed under the lower faces of the edges of the carriage body, are fitted at their ends (when the hood is unfolded and hooked on) in the front and rear walls of the carriage body or eventually in edgings of the latter and, after being placed in position, are cambered by a simple thrust of the hand so as to give to the upper face of the hood 1 a convex appearance in the same way as explained concerning Figs. 1 and 2.

The essential arrangements which have just been described can be completed by the following remarks:

The statement of the operation for covering the car, which is effected from the interior during running and by one person only, without appreciable muscular effort, indicates that the transverse blades 2 must have a sufficient length in order that, when the hood is stretched, their ends are flush with the exterior of the longitudinal ledge 14ª so that the curtain 7 covers the exterior of this ledge for preventing the entrance of rain. The spacing apart of the blades 2 must be so calculated that the stretched hood presents an appearance as æsthetic as possible. The mechanical features of the resilient blades 9 or 13 must be so chosen that these blades do not yield under the action of the jolts of the road and constantly maintain the convex shape of the hood. The resiliency of the securing members 4 must also be suitably chosen for avoiding the wavering of the hood at high speeds. The nature and the arrangement of the securing members 6—4 are obviously extremely variable and are left to the choice of the manufacturer.

It is also possible, besides, the examples illustrated in Figs. 3 to 4, to have recourse, and particularly in the case of small cars, to the simple arrangement illustrated in Fig. 5. In this case use is made of the resiliency of the transverse blades 2 to the exclusion of auxiliary tension means used for causing the hood to bulge out. The edges of the carriage body are provided with grooves 15 throughout their length and the hood 1 being unfolded flatwise in the same way as for the previous examples, all the securing members 6 on one side of the hood are hooked on after having fitted in the groove 15 the end of the blades 2 on that side. The blades 2 are then cambered from place to place by fitting their free ends in the opposite groove 15. The securing members 6 on the remaining side of the hood are then hooked on and the hood is maintained in a bulged out condition as in the forms of construction of the preceding examples. Curtains 7 are also provided for preventing leakage of water, or the bottom of the grooves 15 can be open from place to place by outflow conduits (not shown) opening on the outer side face of the upper edges of the carriage body.

The constructional modification (Figs. 6 to 9), which has received the sanction of practical application, is characterized in that the ends of the cross bars supporting the removable flexible hood are provided, at their ends, with clips which can be locked on a ledge of the rigid part of the carriage body, the tension of the hood being ensured by clamping means interposed between the end cross bars 20 at the front and rear of the carriage body, and the longitudinal edges of the hood being connected to cables or rods stretched between the corresponding ends of the said end cross bars.

A guide or support constituted for instance by the upper flange of an angle member 15 is secured on each of the longitudinal edges 10 of the carriage body roof. This angle member 15 preferably metallic, is secured by screws or equivalent means on the inner face of the rigid edge of the roof 10 and its upper flange serves as a bearing for the ends of the resilient blades 2 secured on the inner face of the hood 1, as explained in the foregoing.

The transverse blades 2, which can be flexible and made of wood or steel, carry at their ends locking clips on the upper flange of the angle member 15. The form of construction of these clips is variable without departing from the scope of the invention. In the example illustrated, they are realized by a lug 16, preferably resilient, secured by rivets, screws, or the like, on the lower face of a blade 2. The screw 17 mounted in the end of blade 2 is preferably provided with a smooth bearing portion on which can freely rotate a roller 18 bearing on the edge of the guide formed by the inner edge of the angle iron 15.

A wing nut 19 is turned on the screw 17 and, by bearing on the lug 16, clamps the blade 2 on the angle iron 15.

The end cross bars of the roof can be constituted as illustrated, by means of rigid angle members 20 (only one of which is shown. Seated on the upper edges of the front and rear walls of the carriage body. These cross bars are provided with locking means on the rigid part of the carriage body. For that purpose, use can be made of the device shown in detail in Fig. 9. Screws 22 are rigidly secured in any suitable manner in the front and rear walls of the carriage body so that their stem projects within the latter. The stems of the screws 22 are preferably in two parts connected by a pivoting axis 23, so that the front part 22ª of the stem which alone is screw threaded can be moved vertically. The vertical flanges of the end bars 20 are notched to receive the hinged ends of the screws when said ends are turned upward. By raising the ends 22ª of the screws into engagement with the end bar and by tightening the nuts 24 the end bar 20 can be adjusted toward the body walls for stretching the hood 1. The horizontal flanges bear on the upper edges of the front and rear walls 21 through the medium of a fluid-tight packing 25 such as felt or rubber for instance. It is of course possible to obtain the same result, with locking means different from those illustrated and described. All these means which do not modify in any way the purpose sought for, are obviously included in the scope of the invention.

The end cross bars 20 are also locked on the slides 15 and, for that purpose, they are provided, at their ends, with flat sole members 20ª which bear on the slide 15 and extend outside the latter for receiving the locking clip 16 already described concerning the intermediate transverse blades.

The assemblage of the hood on the carriage body is effected by first laying it on the slides 15 and by transversely inclining the blades so as to put one after the other of their ends in engagement in the slides.

When the hood is unfolded, the vertical flanges of the end angle members 20 do not touch the carriage body, so as to permit of stretching the hood. As indicated in the foregoing, the longitudinal edges of the hood 1, extend beyond the ends of the blades 2 for forming fluid-tight elements. For avoiding the lifting of these edges, they can be held stretched by any suitable means and in particular by the following arrangement: The cables 26 are inserted in the casings formed in the longitudinal edges of the hood which extend beyond the ends of the blades 2. These edges fit in channels or grooves 30 provided throughout the length of the edges 10 of the rigid part of the carriage body, and the ends of the cables are provided with tensioning devices which take a bearing on the end cross bars 20. For that purpose, these latter are for instance provided with removable lugs 27 perforated at their end which extends in the channel or groove for the passage of a screw-threaded rod 28 connected to the cable 26 and on which is screwed a tensioning screw 29 which bears on the lug 27.

It is obvious that the cables can be replaced by rods or light tubes arranged in the grooves 30 and stretched in any suitable manner by devices bearing on the rigid portion of the carriage body. The edges of the hood 1 can, in this case, be provided with rings or yokes arranged opposite the end of each of the blades 2 and traversed by the rods or tubes.

When it is desired to uncover a portion of the opening in the roof the end cross bar 20 is disengaged, either from the front or from the rear, by turning down the screws 22ª after having previously unscrewed the nuts 24; the nuts 19 are also unscrewed for unlocking the ends of the cross bar and the latter is brought, as well as the blades 2 forming a part of the hood to be folded, by a sliding movement on the angle members 15, in the desired position, then these blades are locked by means of bolts 17 provided at their ends.

In Fig. 8, the hood is shown in a position which uncovers the front part of the roof. The rear part of the hood is folded, the bars 2 situated most at the rear being drawn together. In this position, the cable 26 is unstretched and the edges of the hood are folded to the rear, the front part of the hood being held stretched by locking of the blades 2 and cross bar 20 on the slides 15.

Of course, the improvements the essential points of which have just been set forth apply to all types of motor vehicles and more generally to all movable objects on land, on water, and in the air.

What I claim as my invention and desire to secure by Letters Patent is:

In a folding top for closed vehicle bodies, a flexible hood, transverse members fastened on the under face of the said flexible hood, and comprising intermediate transverse members constituted by resilient blades, two extreme transverse members constituted by angle bars, longitudinal slides at the upper edges of the vehicle body for the ends of the transverse members, means at the ends of the said transverse members for locking the same at any point of the slides, bolts fastened on the upper part of the front and rear walls of the vehicle body, for eventually engaging the vertical wings of the extreme angle bars and tightening the flexible hood when the same is entirely unfolded, longitudinal grooves on the vehicle body adjacent to the longitudinal slides for receiving the longitudinal edges of the flexible hood, and means for maintaining, for tightening purposes, the said edges of the hood in the said grooves.

In testimony whereof I have signed my name to this specification.

EMILE DELALE.